(12) United States Patent
Bellows

(10) Patent No.: US 8,783,043 B2
(45) Date of Patent: Jul. 22, 2014

(54) METHOD FOR REMOVAL OF ENTRAINED GAS IN A COMBINED CYCLE POWER GENERATION SYSTEM

(75) Inventor: James C. Bellows, Maitland, FL (US)

(73) Assignee: Siemens Aktiengesellschaft, München (DE)

( * ) Notice: Subject to any disclaimer, the term of this patent is extended or adjusted under 35 U.S.C. 154(b) by 1185 days.

(21) Appl. No.: 12/503,177

(22) Filed: Jul. 15, 2009

(65) Prior Publication Data

US 2011/0011057 A1    Jan. 20, 2011

(51) Int. Cl.
*F02C 3/30* (2006.01)
*F02C 6/00* (2006.01)
*F02C 9/00* (2006.01)

(52) U.S. Cl.
USPC ........... 60/775; 60/39.182; 60/39.26; 60/39.3

(58) Field of Classification Search
USPC .................. 60/39.182, 39.26, 39.3, 775, 793
See application file for complete search history.

(56) References Cited

U.S. PATENT DOCUMENTS

| 5,375,410 | A | 12/1994 | Briesch et al. | |
|---|---|---|---|---|
| 5,761,896 | A * | 6/1998 | Dowdy et al. | ................... 60/775 |
| 6,321,526 | B1 * | 11/2001 | Hamana | ........................... 60/775 |
| 6,389,794 | B2 * | 5/2002 | Ranasinghe et al. | ............ 60/775 |
| 6,442,924 | B1 * | 9/2002 | Talley et al. | ..................... 60/783 |
| 7,306,653 | B2 | 12/2007 | Bellows | |
| 2006/0086248 | A1 | 4/2006 | Bellows | |
| 2009/0126338 | A1 | 5/2009 | Kitaguchi | |

FOREIGN PATENT DOCUMENTS

| EP | 0789134 A2 | 8/1997 |
|---|---|---|
| RU | 2015353 | 8/1991 |
| RU | 2153081 | 9/1997 |
| RU | 2230921 | 6/2004 |
| WO | 9612091 A1 | 4/1996 |

* cited by examiner

*Primary Examiner* — William H Rodriguez
*Assistant Examiner* — Arun Goyal

(57) ABSTRACT

A combined cycle power generation system (10) includes a steam turbine (14, 16, 18), a combustion system (12) including a compressor (24), a combustion chamber (26), a gas turbine (28), and a HRSG (20) to generate steam with energy from the combustion turbine. A flow line (60, 70) passes superheated steam into the combustion chamber. In an associated method a first source of power is provided via a combustion process having a variable reaction temperature in a first turbine. A second source of power is provided via a second turbine. Components of the system are placed in a mode of increasing power output with steam generated from the HRSG, during which a portion of the steam is provided into a combustion chamber associated with operation of the second turbine.

17 Claims, 1 Drawing Sheet

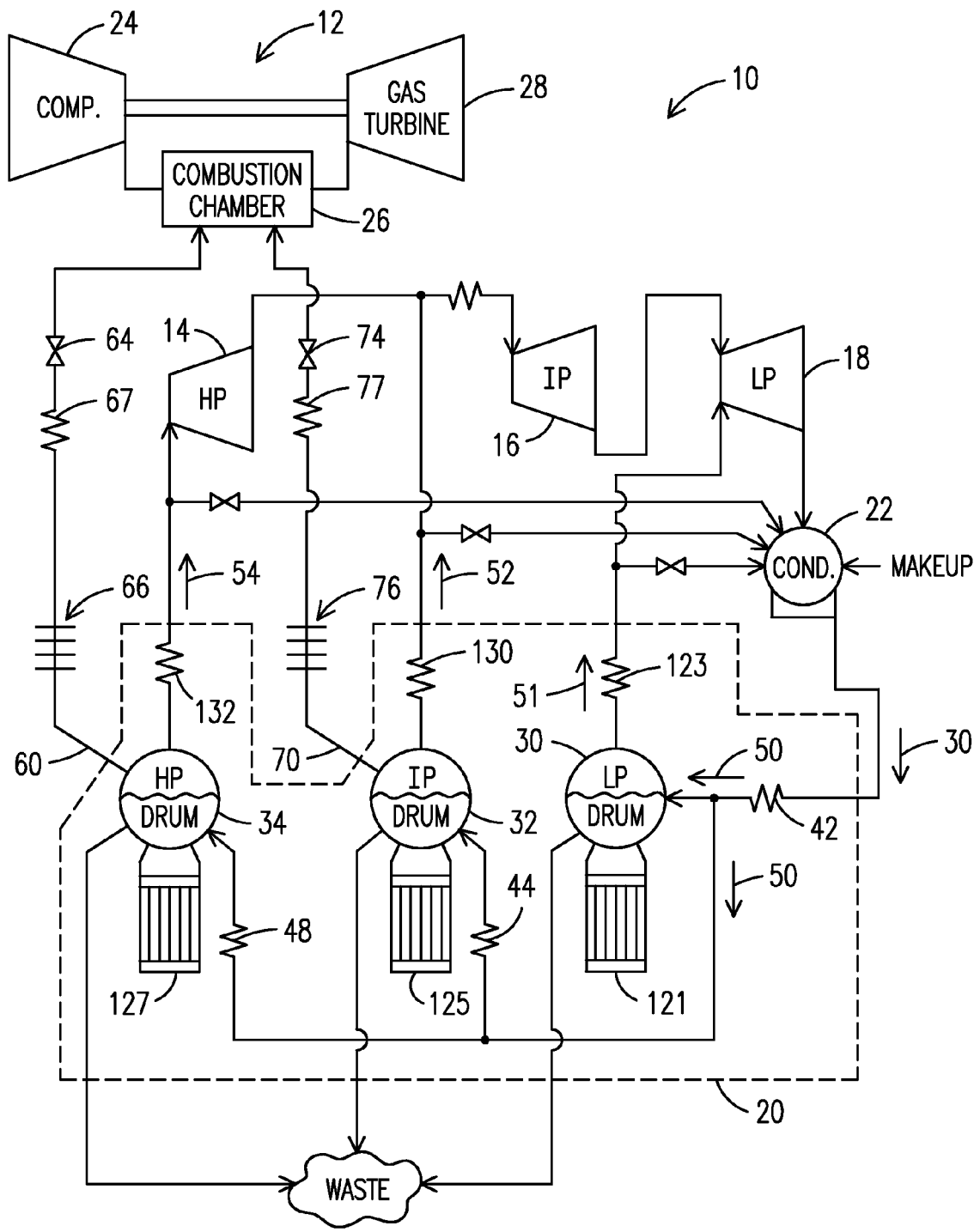

METHOD FOR REMOVAL OF ENTRAINED GAS IN A COMBINED CYCLE POWER GENERATION SYSTEM

FIELD OF THE INVENTION

The present invention relates generally to power systems and, more particularly, to combined cycle power generation systems of the type incorporating both a Rankine cycle and a combustion process. More specifically, the invention relates to a systems and methods for reducing the levels of undesirable gaseous materials present in such combined cycle power generation systems.

BACKGROUND OF THE INVENTION

Combined cycle power plants have come into widespread use because they incorporate heat exchangers that can recover heat from the hot gas exhaust stream of a combustion engine. Conventionally the recovered heat is used to generate the working fluid of a steam turbine. This results in more efficient power generation than is achievable with only a combustion turbine or only a steam turbine. See, for example, U.S. Pat. No. 5,375,410 which is assigned to the assignee of the present invention and incorporated herein by reference.

Generally, combined cycle power generation systems include a first power source which operates on a Rankine cycle, e.g., a steam cycle, and a second power source based on a combustion process wherein heat recovered from the hot exhaust gases of the combustion process is transferred to the working fluid in the Rankine cycle. Such systems render overall plant efficiencies on the order of 55 percent or higher. System operations are subject to numerous constraints in order to reduce undesirable atmospheric emissions and to reduce deleterious effects on the complex, high speed mechanical components. It is therefore necessary to accurately monitor and control numerous processes in power generation systems.

For example, the prevalence of strong and weak acids in a conventional steam cycle varies with time, and the ability to accurately monitor constituents, such as hydrochloric acid or acetic acid, is critical to controlling these chemicals to levels which maximize the useful life of the mechanical components. However, when monitoring strong acid content based on cation conductivity, weak acid content, e.g., resulting from entrainment of low levels of carbon dioxide in the steam cycle, can mask the presence of the strong acids. This problem occurs at carbon dioxide concentrations on the order of less than 0.03 percent based on atmospheric intrusions. For example, the steam cycle condenser is normally maintained under a partial vacuum, but when the system is shut down the vacuum is lost. Consequently, small amounts of carbon dioxide can enter the system and be absorbed into ammonia-rich feedwater. When the system starts up, such weak acid content can accompany the working fluid through the cycle. One method of preventing such carbon dioxide intrusion would be to maintain the vacuum while the steam turbine is shut down, and provide a continued supply of steam to the associated gland seals. A method for removing carbon dioxide from the working fluid is to simply vent the fluid, but this can require exhausting relatively large amounts of the hot fluid, resulting in undesirable thermal losses. The associated expense of either solution is to be avoided.

Combustion process constituents in combined cycle power generation systems also must be accurately monitored and controlled, e.g., for environmental reasons. The control process can be complex because the levels of chemical emissions vary as a function of operating state. Ideally, power generation processes might be simpler to control under steady state conditions, but dynamic and varied power output is often necessary or desirable. For example, during starting-up combustion turbines can emit undesirably high levels of regulated emissions, especially when the power output levels are less than seventy five percent of the maximum steady state power output. To reduce the NOx emissions (e.g., $NO_2$ and $NO_3$) during start-up of the combustion process, it is necessary to limit flame (combustion) temperature.

Generally it is desirable to find more effective and efficient ways to reduce the adverse effects of constituents present in power generation processes.

BRIEF DESCRIPTION OF THE DRAWING

The invention is explained in the following description in view of the sole FIGURE which illustrates a simplified schematic diagram of a combined cycle power generation system incorporating an embodiment of the invention.

DETAILED DESCRIPTION OF THE INVENTION

The figure illustrates a simplified example embodiment of a combined cycle system 10 formed with a combustion turbine system 12, a high pressure steam turbine 14, an intermediate pressure steam turbine 16, a low pressure steam turbine 18, a Heat Recovery Steam Generator (HRSG) 20 (shown with phantom lines), and a condenser 22 coupled to receive working fluid from the low pressure steam turbine 18. The combustion turbine system 12 comprises an air compressor section 24, a combustion chamber 26 and a gas turbine 28 which are shown schematically. Other conventional components and fluid flow lines are omitted for clarity. For example, it is to be understood that a fluid flow line connects the exhaust output of the turbine 28 to an input at the high temperature side of the HRSG 20. Generally a combined cycle system in accord with the invention may comprise multiple low, intermediate and high pressure steam turbines, multiple gas turbines and multiple HRSGs.

Exhaust (not shown) from the combustion turbine 28 is sent through the HRSG 20 after which it is vented (also not shown). The HRSG 20 includes low, intermediate and high pressure stages which are shown schematically. The low pressure stage comprises an economizer 42, a low pressure drum 30, a low pressure evaporator 121 and a low pressure superheater 123. The economizer 42 heats water 30 derived from steam exiting the low pressure steam turbine 18 and which flows from the condenser 22 in liquid form. The economizer 42 produces hot water 50 close to the boiling point in the low pressure stage, a portion of which is provided to the low pressure drum 30 for recirculation in the evaporator 121 to make steam 51 which passes through the drum 30, through the LP superheater 123, and through the turbine 18. A portion of the hot water 50 output from the economizer 42 is input to the intermediate pressure stage of the HRSG 20, which comprises a second economizer 44, an intermediate pressure steam drum 32, an intermediate pressure evaporator 125 and a superheater 130. The water 50 input to the intermediate pressure stage circulates through the second economizer 44 where it is heated to nearly the saturation temperature of the IP stage, then passed into the intermediate pressure steam drum 32 and then through the intermediate pressure evaporator 125 to generate intermediate pressure steam 52. Steam exiting the drum 32 is saturated. Intermediate pressure steam 52 from the intermediate pressure drum 32 passes through the intermediate pressure superheater 130 (which forms the high temperature heating component of the intermediate stage of the HRSG 20) to further elevate the temperature of the working fluid prior to entry into the intermediate pressure steam turbine 16.

The majority of the hot water 50 output from the economizer 42 is input to the high pressure stage of the HRSG 20, which comprises a third economizer 48, a high pressure steam drum 34, a high pressure evaporator 127 and a high pressure superheater 132. Initially, the hot water 50 circulates through the third economizer 48 and then passes into the high pressure steam drum 34. From the high pressure steam drum 34 the water flows into the high pressure evaporator 127 to generate high pressure steam 54.

In the example embodiment the high pressure steam 54 generated by the high pressure evaporator 127 is saturated. The high pressure evaporator is coupled to the high pressure steam drum 34 which is coupled to the high pressure superheater 132 which forms the high temperature heating component of the high pressure stage of the HRSG 20. The high pressure steam 54 passes through the high pressure drum 34 and the high pressure superheater 132 to further elevate the temperature of the working fluid supplied to the high pressure steam turbine 14.

Although details of such are not shown in the FIGURES, the illustrated HRSG 20 may include flow paths for multi-pressure circuits each comprising an economizer, an evaporator and a superheater.

Each of the intermediate and high pressure drums 32 and 34 includes a flow line connection directly into the combustion chamber 26. A high pressure saturated steam flow line 60 carries high pressure saturated steam 54 from the drum 34 to the combustion chamber 26. Flow through the line 60 is controlled by a valve 64. The flow line 60 also includes a condenser 66 and a superheater 67. The superheater 67 may be in the gas pass of the HRSG 20 or may be an electrically heated heat exchanger. An intermediate pressure super heated steam flow line 70 carries intermediate pressure saturated steam 52 from the drum 32 to the combustion chamber 26. Flow through the line 70 is controlled by a valve 74. The flow line 70 also includes a condenser 76 and a superheater 77. The superheater 77 may be in the gas pass of the HRSG 20 or may be an electrically heated heat exchanger.

During start-up of the system 10, as soon as steam 54 or 52 of sufficient pressure is generated from each of the high and intermediate pressure stages of the HRSG 20, the corresponding and respective valve 64 or 74 is opened to permit flow of the superheated steam into the combustion chamber 26. A first feature of the process is that almost immediately upon generation of the steam 54 or 52, the majority of the carbon dioxide previously dissolved in the feedwater is volatized and mixed with the steam. Thus the amount of steam injection needed to remove a substantial portion of the carbon dioxide present in the working fluid is relatively small. Consequently the thermal loss associated with removal of carbon dioxide is also relatively small. Losses of purified water are further reduced with inclusion of the condensers 66 and 76 which are of design similar to the vent condensers described in U.S. Pat. No. 7,306,653 incorporated herein by reference.

Functionally the condensers 66, 76 can reduce the amount of steam which must be transferred into the combustion chamber 26 when transferring carbon dioxide from a flow line 60 or 70. The condensers 66 and 76 are positioned in the system 10 with a non-horizontal orientation in order to effect upward movement of the steam and gravity flow downward movement of condensate formed therein. As the steam progresses upward along the condenser a substantial portion of the steam is condensed to create a flow of water toward the associated drum 32 or 34. Creation of the condensate can be aided by inclusion of distillation packing 82 in the condenser or by provision of cooling fins 84 that facilitate thermal exchange with a cooler environment along the exterior of the condenser. See, again, U.S. Pat. No. 7,306,653. Dimensions of the condensers 66 and 76 will depend on a variety of factors including whether distillation packing is included and the maximum permitted flow rate of steam entering into the chamber 26. The concentration of carbon dioxide in the condenser 66 or 76 increases as a function of position, i.e., as gases flow toward the combustion chamber 26, because steam is being converted into liquid which travels down the condensers. A relatively cool water source (such as from the condenser 22) may also be injected near an upper portion of a condenser 66 or 76 to be heated by the up-flowing steam, thereby cooling the condensate and facilitating condensation in the condenser 66 or 76. Addition of the cooling water reduces the amount of steam transferred to the combustion turbine with the carbon dioxide, and thereby decreases the amount of energy required to superheat the steam to the required, for example, 50° F. prior to entry into the combustion chamber 26.

Also during start-up of the system 10, a second feature of the process is that with one or both of the valves 64 or 74 open, and with the ramping up toward full power generation, the injection of superheated steam lowers the flame (combustion) temperature so that the combustion reaction does not occur at a peak flame temperature. Consequently the level of NOx emissions is suppressed. This is especially advantageous while the generator is operating below seventy five percent capacity.

Generally, by evaporating a first portion of the working fluid, e.g., resulting in the steam 52 or 54, a portion of entrained gas present in the system immediately mixes with the vaporous working fluid to form a gaseous mixture which can be injected into the combustion chamber 26 at appropriate times to remove a portion of entrained gas (e.g., reduce carbon dioxide content of the working fluid) or adjust the combustion temperature, thereby controlling the level of NOx emissions.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The claimed invention is:

1. A combined cycle power generation system comprising:
   a steam turbine system;
   a combustion turbine system including a compressor, a combustion chamber and a gas turbine;
   a HRSG coupled between the combustion turbine and the steam turbine to generate steam with thermal energy received from the combustion turbine, the HRSG including a first stage configured to provide high pressure steam and a second stage configured to provide lower pressure steam;
   a first condenser coupled to transfer working fluid from a low pressure stage of the steam turbine system to the HRSG;
   a flow line connected between the HRSG and the combustion chamber of the turbine system to receive saturated steam created in the HRSG and pass steam into the combustion chamber;
   a superheater positioned in the flow line between the HRSG and the combustion chamber to generate superheated steam from the saturated steam and provide the superheated steam to the combustion chamber; and a second condenser configured in the flow line between either the first stage of the HRSG or the second stage of the HRSG and the superheater to (i) convert a portion of the steam in the flow line into liquid water and (ii) permit gravity flow of the liquid water back to the HRSG, the condenser reducing the amount of steam which must be transferred into the combustion chamber when transferring a given amount of carbon dioxide from the flow line into the combustion chamber.

2. The combined cycle power generation system of claim 1 wherein the flow line is connected between a drum in the first stage of the HRSG and the combustion chamber.

3. The combined cycle power generation system of claim 1 further including a valve positioned to selectively input amounts of the superheated steam from the flow line connected between the HRSG and the combustion chamber to receive saturated steam into the combustion chamber during start-up of the system.

4. The combined cycle power generation system of claim 3 wherein the system is configured to control operation of the valve to inject steam into the chamber so that combustion temperature in the combustion chamber is reduced.

5. The combined cycle power generation system of claim 3 wherein the system is configured so that, during start-up, the flow line carries carbon dioxide mixed with the superheated steam into the combustion turbine.

6. The combined cycle power generation system of claim 5 wherein the system is configured so that the valve enables injection of carbon dioxide mixed with steam as soon as the steam is generated.

7. The combined cycle power generation system of claim 1 wherein the system is configured so that injection of the superheated steam reduces $NO_x$ emissions of the combustion turbine when operating at a partial load output level.

8. The combined cycle power generation system of claim 7 wherein the injection of the superheated steam reduces $NO_x$ emissions of the combustion turbine when operating at less than 75 percent of a full load output level.

9. A method for operating a combined cycle power generation system of the type having (i) a Rankine cycle providing a first source of power via a first turbine, and (ii) a combustion process, having a variable reaction temperature, providing a second source of power via a second turbine, and a HRSG coupled between the first and second turbines to generate saturated steam with thermal energy received from the second turbine, the HRSG including a first stage configured to provide high pressure steam and a second stage configured to provide lower pressure steam, the power generation system including a first condenser coupled to transfer working fluid from a low pressure stage of the steam turbine system to the HRSG, the method comprising the steps of:

placing components of the system in a start-up mode in which the turbines generate increasing power output relative to maximum values and whereby the steam is generated with thermal energy received from the second turbine by evaporating working fluid from a liquid state with heat recovered from the combustion process;

providing, during the start-up mode, a portion of the saturated steam generated in the HRSG with thermal energy received from the second turbine to create superheated steam and injecting the superheated steam into a combustion chamber associated with operation of the second turbine; and prior to creating the superheated steam, processing the saturated steam in a second condenser to increase concentration of carbon dioxide and return condensed steam to the Rankine cycle, where the second condenser is positioned to receive the saturated steam from either the first stage of the HRSG or the second stage of the HRSG before the portion of the saturated steam generated in the HRSG is provided with the thermal energy received from the second turbine to create the superheated steam.

10. The method of claim 9 wherein the process of providing steam into the combustion chamber during the start-up mode removes entrained gas from components of the system associated with operation of the Rankine cycle.

11. The method of claim 9 wherein the process of providing steam into the combustion chamber during the start-up mode reduces the reaction temperature of the combustion process.

12. The method of claim 9 wherein the process of providing steam into the combustion chamber during the start-up mode reduces $NO_x$ content of exhaust gas generated by the combustion process.

13. The method of claim 9 wherein a flow line carries a combination of carbon dioxide mixed with the superheated fluid into the combustion chamber thereby removing carbon dioxide from components associated with the Rankine cycle.

14. The method of claim 9 wherein injecting a portion of the gaseous mixture into the combustion chamber lowers the reaction temperature of the combustion process.

15. A method for operating a combined cycle power system of the type having a Rankine cycle providing a first power component and a combustion process providing a second power component, comprising:

providing a source of working fluid, a component of which is in a liquid state during a portion of a Rankine cycle, the liquid state resulting from a first condensation of working fluid during transfer of the working fluid from a low pressure stage of the Rankine cycle;

generating steam in a HRSG having a first stage configured to provide high pressure steam and a second stage configured to provide lower pressure steam by evaporating a first portion of the working fluid with thermal energy received from the combustion process so that a portion of entrained gas present in the system mixes with the first portion to form a gaseous mixture;

during the start-up mode, the liquid state also resulting from a second condensation performed along a flow path which receives the saturated steam from either the first stage of the HRSG or the second stage of the HRSG before a remaining portion of the gaseous mixture is superheated along the flow path, the second condensation condensing a portion of the steam present in the gaseous mixture and returning condensed steam to the HRSG; and after condensing the portion of the steam during the start-up mode, superheating said remaining portion the of the gaseous mixture and injecting said remaining superheated portion the of the gaseous mixture into a combustion chamber which provides the second power component.

16. The method of claim 15 wherein injection of the gaseous mixture into the chamber reduces $NO_x$ content of exhaust gas generated by the combustion process.

17. The method of claim 15 wherein injection of the gaseous mixture into the chamber reduces carbon dioxide content in the working fluid.

* * * * *